United States Patent [19]

Taskett

[11] Patent Number: 5,991,748
[45] Date of Patent: Nov. 23, 1999

[54] METHODS AND APPARATUS FOR REGENERATING A PREPAID TRANSACTION ACCOUNT

[75] Inventor: John M. Taskett, Salt Lake City, Utah

[73] Assignee: American Express Travel Related Services Company, Inc., New York, N.Y.

[21] Appl. No.: 08/760,896

[22] Filed: Dec. 6, 1996

[51] Int. Cl.[6] .................................................. G06F 17/60
[52] U.S. Cl. ............................ 705/41; 705/39; 705/40
[58] Field of Search ................................... 705/34, 39, 40, 705/41, 42; 235/380, 381, 379, 487; 379/144, 130, 114, 112

[56] References Cited

U.S. PATENT DOCUMENTS

| Re. 32,985 | 7/1989 | Negata et al. ............................. 705/39 |
|---|---|---|
| 3,637,994 | 1/1972 | Ellingboe ............................... 235/488 |
| 4,034,211 | 7/1977 | Horst et al. ............................ 235/454 |
| 4,614,861 | 9/1986 | Pavlov et al. ........................... 235/380 |
| 4,700,055 | 10/1987 | Kashkashian, Jr. ..................... 235/379 |
| 4,725,719 | 2/1988 | Oncken et al. ......................... 235/487 |
| 4,877,947 | 10/1989 | Mori ........................................ 705/41 |
| 4,973,828 | 11/1990 | Naruse et al. .......................... 235/380 |
| 4,975,942 | 12/1990 | Zebryk .................................... 379/144 |
| 5,352,876 | 10/1994 | Watanabe et al. ....................... 235/381 |
| 5,353,335 | 10/1994 | D'Urso et al. ............................ 379/67 |
| 5,359,642 | 10/1994 | Castro .................................... 379/121 |
| 5,530,232 | 6/1996 | Taylor .................................... 235/380 |
| 5,577,109 | 11/1996 | Stimson et al. ......................... 379/112 |
| 5,578,808 | 11/1996 | Taylor .................................... 235/380 |
| 5,590,038 | 12/1996 | Pitroda .................................... 705/41 |
| 5,621,787 | 4/1997 | Mckoy et al. .......................... 379/144 |
| 5,640,447 | 6/1997 | Fonseca ................................. 379/144 |
| 5,649,118 | 7/1997 | Carlisle et al. .......................... 705/41 |
| 5,673,309 | 9/1997 | Woynoski et al. ....................... 379/144 |
| 5,696,908 | 12/1997 | Muehlberger et al. ................... 705/39 |
| 5,704,046 | 12/1997 | Hogan ...................................... 705/39 |
| 5,721,768 | 2/1998 | Stimson et al. ......................... 379/114 |
| 5,722,067 | 2/1998 | Fougnies et al. ....................... 455/406 |
| 5,760,381 | 6/1998 | Stich et al. ............................. 235/380 |

FOREIGN PATENT DOCUMENTS

| 0 402 302 A2 | 12/1990 | European Pat. Off. . |
|---|---|---|
| 0 698 987 A2 | 2/1996 | European Pat. Off. . |
| 42 43 851 A1 | 6/1994 | Germany . |
| 2 215 897 | 9/1989 | United Kingdom . |
| WO 96/03830 | 2/1996 | WIPO . |

OTHER PUBLICATIONS

Card Technology, CLIP Begins Clip–Clopping Acrross Europe, Dialog file 9, Accession No. 01627390, Sep. 1996.
Weatherington, "Credit Cards . . . ", Credit Union News, v15, n18, p1, 10+, Sep. 22, 1993, Dialog file 268, Accession No. 00271638, 1995.

*Primary Examiner*—Allen R. MacDonald
*Assistant Examiner*—Romain Jeanty
*Attorney, Agent, or Firm*—Snell & Wilmer L.L.P.

[57] ABSTRACT

An improved system for "regenerating" or adding funds to a prepaid, remote memory account. The system includes a service provider network or host computer system including an account database of prepaid accounts. An integrated transaction card is issued to a consumer. One side of the card shows a prepaid telephone card for accessing the host computer system and an authorization code that allows access to the account database. The other side of the integrated transaction card is a transaction instrument, such as a prepaid transaction card, credit card, debit card, or the like. Information relating to the transaction instrument is stored at the host system so that a consumer may transfer funds from the transaction instrument to the prepaid phone card without the host system having to prompt the consumer for the necessary transfer information.

27 Claims, 7 Drawing Sheets

METHODS AND APPARATUS FOR REGENERATING A PREPAID TRANSACTION ACCOUNT

TECHNICAL FIELD OF THE INVENTION

The present invention relates, generally, to a transaction card for purchasing goods or services and, more particularly, to methods and apparatus for transferring funds or prepaying a transaction card and its associated remote memory account.

BACKGROUND OF THE INVENTION

Known remote memory, prepaid accounts are used to purchase goods and services and involve a printed transaction card constructed from plastic or cardboard and bearing a unique authorization or account number and instructions for accessing funds, services, and the like. The other side of the transaction card includes a non-functional photograph, drawing or other aesthetically-pleasing image.

Known remote-memory, prepaid cards have been used extensively throughout the world. One example is a prepaid telephone calling card that includes a toll-free telephone number and dialing instructions for accessing a host computer system. A unique authorization code is typically associated with each remote account. When a calling party uses the card to place a long distance call, the toll-free number is dialed, thereby accessing the host system which manages the remote accounts. The calling party enters a predetermined authorization number for allowing access to the database. The calling party then enters a long distance telephone number, whereupon the system connects the calling party with the desired calling destination. The long distance telephone charges attributed to the telephone call are deducted from the account balance. The call connection may be terminated by the calling party or by the host system when the account is fully consumed. Generally, when the prepaid account balance is depleted, the user must discard the spent card and purchase a new card.

Such known prepaid cards are disadvantageous because the need to constantly purchase new prepaid cards is burdensome to the consumer. Discarding spent cards is also wasteful and harmful to the environment. Known prepaid card systems are also costly because new cards must be produced and distributed.

Other known schemes provide prepaid cards capable of being regenerated by increasing the account balance. Typically, a consumer regenerates the card by connecting to the host computer, entering a credit card number and expiration date, home zip code, and a regenerate amount. The consumer then directs the host system to withdraw funds from the credit card and deposit the funds into the prepaid card account.

The known method for regenerating prepaid phone cards is disadvantageous because the consumer must enter a cumbersome amount of data from the telephone. A high risk of erroneously entered data is also present. Moreover, regenerating must take place before or after placing phone calls. Known prepaid calling cards do not allow a card to be regenerated during a phone call connection to a called destination or in response to a host system's notification that the account balance is about to be depleted.

Thus, there exists a long-felt need to provide a new prepaid calling card that permits that account balance to be regenerated more efficiently, effectively and with less risk of error. The present invention overcomes the disadvantages associated with existing prepaid calling cards, providing the consumer with a new and much improved system for regenerating an integrated prepaid calling card instrument.

SUMMARY OF THE INVENTION

The present invention provides a method and apparatus for regenerating a prepaid telephone card. By "regenerating" it is meant that funds are transferred or otherwise added to a prepaid account. The system includes a service provider network, or host system, comprising a database of prepaid accounts. An integrated transaction card, e.g., a prepaid phone card, is issued to a consumer. The host system has accessible stored data relating to a funds source for regenerating a particular phone card. That stored data allows the caller to regenerate the prepaid card without having to provide such information at the time of regeneration.

In accordance with a preferred embodiment of the invention, one side of the transaction card shows a prepaid telephone card having a telephone number for accessing the host system and an authorization code for allowing access to the account database. The other side of the card is a transaction instrument, such as a prepaid instrument, a credit card, a debit card, or the like. Information relating to the transaction instrument is stored in the host system memory so that a user of the card can conveniently regenerate the telephone card. Funds are deducted from the transaction instrument and added to the telephone card without requiring the user to enter any information relating to the transaction instrument. More preferably, the transaction instrument may be used independently of the phone card to purchase other goods or services.

In one embodiment, the transaction instrument is issued in conjunction with the prepaid phone card. Alternatively, the transaction instrument is selected by the consumer and registered with the host system. Future transactions are facilitated by initially authorizing the host system to transfer funds from the transaction instrument to the phone card.

In another embodiment, the prepaid phone card is recharged during a phone call connection. A consumer is notified during a phone connection to a called party when the account balance of the phone card depletes to a predetermined amount. At such time, the consumer recharges the phone card by pressing a key or keys on a telephone keypad to indicate an amount of funds to be transferred to the phone card from the associated transaction instrument(s). The host system can recharge the phone card without any more information or customer input because that information is stored in the host system. Once the funds are transferred to the prepaid phone card, the customer is reconnected to the called party. Preferably, the connection to the called party is maintained throughout the recharge sequence.

BRIEF DESCRIPTION OF THE DRAWINGS

Preferred exemplary embodiments of the present invention are hereinafter described in conjunction with the appended drawing figures, wherein.

DETAILED DESCRIPTION OF THE INVENTION

It will be appreciated that the present invention broadly contemplates virtually any type of prepaid transaction instrument. For a more thorough discussion of prepaid transaction instruments and prepaid telephone cards, the reader is referred to the following Unites States patent applications filed and pending in the United States Patent and Trademark Office: Ser. No. 08/456,525 entitled "Methods and Apparatus for Providing a Prepaid, Remote Memory Customer Account," filed Jun. 1, 1995 by John Taskett; Ser. No. 08/458,715 entitled "Refundable Prepaid Telephone Card," filed Jun. 1, 1995 by John Taskett; Ser. No. 08/503,071 entitled "Method and Apparatus for Generating Summaries of Prepaid Instrument Transaction Activity," filed on Jul. 14, 1995 by John Taskett; Ser. No. 08/510,590 entitled "Methods and Apparatus for Providing a Prepaid, Remote Entry Customer Account for the Visually Impaired," filed on Aug. 2, 1995 by John Taskett and Barbara Piernot; Ser. No. 08/510,196 entitled "Methods and Apparatus for Providing a Prepaid, Remote Entry Customer Account for the Hearing Impaired," filed on Aug. 2, 1995 by John Taskett; Ser. No. 08/551,814 entitled "Methods and Apparatus for Providing a Prepaid, Remote Entry Customer Account Having Multiple Language Capability," filed on Nov. 7, 1995 by John Taskett; Ser. No. 08/612,256 entitled "Methods and Apparatus for Providing a Prepaid, Remote Entry Customer Account with Transaction Card and Corresponding Voice Indicia," filed on Mar. 7, 1996 by John Taskett; Ser. No. 08/965,712 entitled "Methods and Apparatus for Language Registration of Prepaid, Remote Entry Customer Account," filed on Nov. 7, 1997 by Jerry Thomas; and Ser. No. 08/732,177 entitled "Methods and Apparatus for Improved Paging System," filed on Oct. 16, 1996 by John Taskett and Chuck Chamberlain, whereby the subject matter of each patent application is incorporated herein by reference.

Figure 1A:
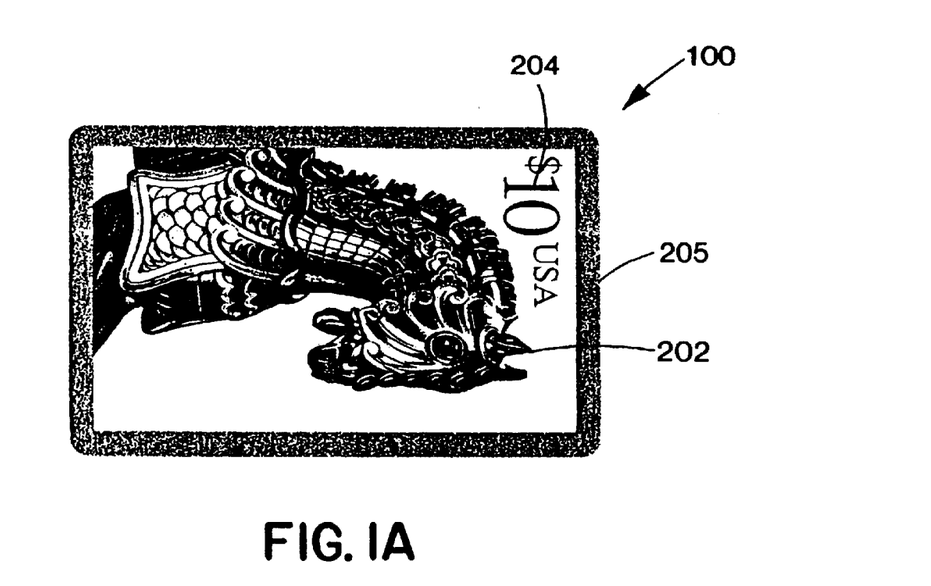
FIG. 1A shows a frontal view of a first integrated transaction card.

As shown in FIG. 1A, a first side of an exemplary integrated transaction card 100 comprises a prepaid transaction card 205 used by the consumer to purchase gasoline, groceries, hotel rooms, meals, or various other products or services. The prepaid account balance is stored in a host computer 308. When the consumer uses prepaid card 205 to make a purchase, the host computer 308 deducts the amount of the purchase from the then current account balance.

Prepaid card 205 includes indicia 202 which may be a photograph, drawing or other design. A fund value 204 is printed on prepaid instrument 205 to indicate the initial value associated with the instrument. The fund value 204 may be in U.S. currency, card units, credits, or the like. The value of card 205 fluctuates according to whether funds have been added or withdrawn.

Figure 1B:
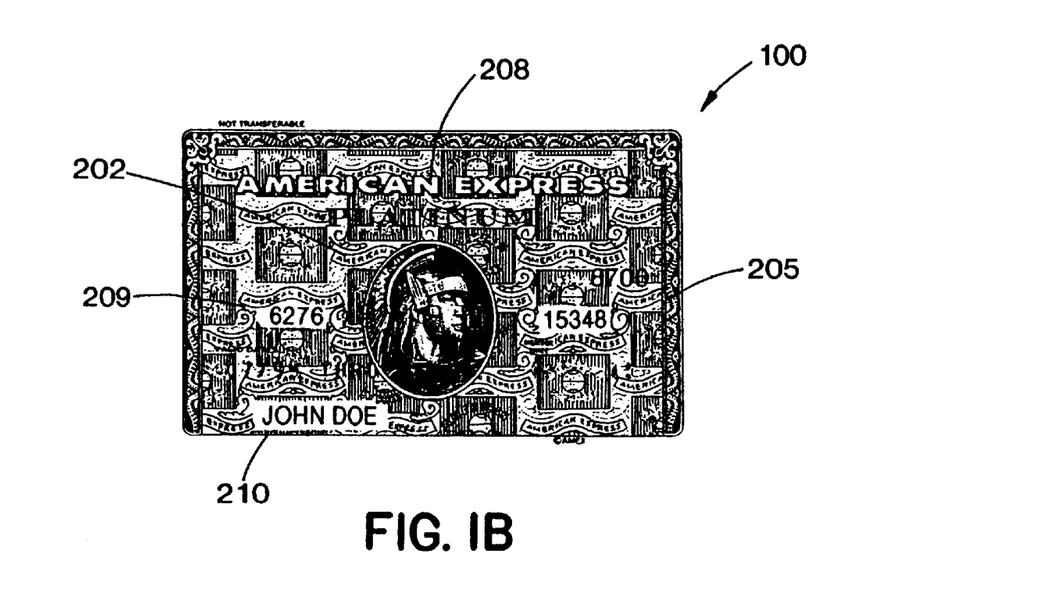
FIG. 1B shows a frontal view of a second integrated transaction card.

As shown in FIG. 1B, an integrated transaction card 100 includes a credit card or charge card 205, for example an American Express Platinum card. Credit card 205 may be used by the consumer to make ordinary credit card transactions. Preferably, credit card 205 includes a visual indicia 202 such as a photograph, drawing, or other design. The credit card 205 includes an account number 209 used in ordinary credit or charge card transactions, an issuer name 208, and a consumer name 210.

Figure 2:
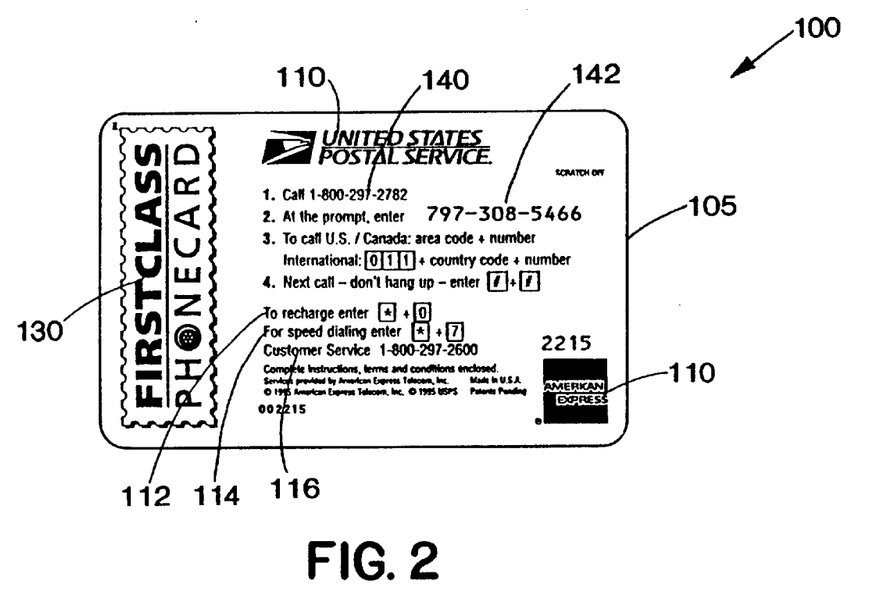
FIG. 2 shows a rear view of an integrated transaction card.

As shown in FIG. 2, the integrated transaction card 100 also includes a prepaid telephone card 105. Prepaid telephone card 105 includes an access telephone number 140 for accessing the host computer 308 system and an authorization code 142 for associated with an account database 310. An access telephone number 140 may be a toll-free 800 number, a 900 number, a local phone number or the like. Authorization code 142 is preferably unique to a particular telephone card 105. Authorization code 142 is a predetermined number printed on telephone card 105 before being issued to the consumer. Alternatively, code 142 is selected by the individual and stored in the account database 310 of the host computer 308.

Card 105 suitably bears printed instructions which instruct the user to dial access number 140 to access the host computer 308. The host computer 308 maintains the account that has funds withdrawn or otherwise consumed as a consequence of the telephone calls placed with the phone card 105. Phone card 105 then instructs the user to enter an authorization code 142. A bar code, magnetic strip or other suitable indicia (not shown) may be exhibited on phone card 105. Such indicia allows the authorization code 142 to be read by a bar code reader or other scanning device alleviating the need for manual entry of authorization code 142. The user is then instructed to dial a desired destination telephone number either in the United States or other countries. Card 105 may also include instructions for placing additional calls.

Telephone card 105 further provides instructions 114 for speed-dialing and for contacting customer service. Additional indicia 110, 130 are printed on the phone card 105 showing trademarks, service marks or advertising.

Prepaid telephone card 105 further includes an instruction 112 for regenerating the card 105 with additional currency or units. In accordance with a preferred embodiment, the user regenerates the account corresponding to card 105 while connected to the host computer 308 via a service provider network or during a call connection to a third party. For example, by entering "*0" from the telephone keypad when connected to the service provider or during a call connection, a regeneration menu is accessed to transfer funds from the transaction instrument 205 to the prepaid phone card 105. All information necessary for transferring funds (e.g. identification number, expiration date, and the like) is stored in the database 310 at the service provider network. As a result, the caller does not have to re-enter the information when regenerating the card 105.

The service provider network prompts the caller to enter the amount of funds to be transferred from instrument 205 to phone card 105. The caller suitably enters the amount on the phone keypad. In an alternative embodiment, the caller speaks the amount into the telephone whereupon a voice recognition circuit in the service provider network recognizes and interprets the verbal command.

Alternatively, a predetermined amount of funds can be transferred by entering, for example, "*0." The predetermined amount is suitably transferred from the account associated with instrument 205 to the account associated with card 105. In another embodiment, the host system withdraws funds from the transaction instrument 205 and regenerates prepaid card 105 as appropriate without requiring the caller to authorize each withdrawal.

Figure 3:
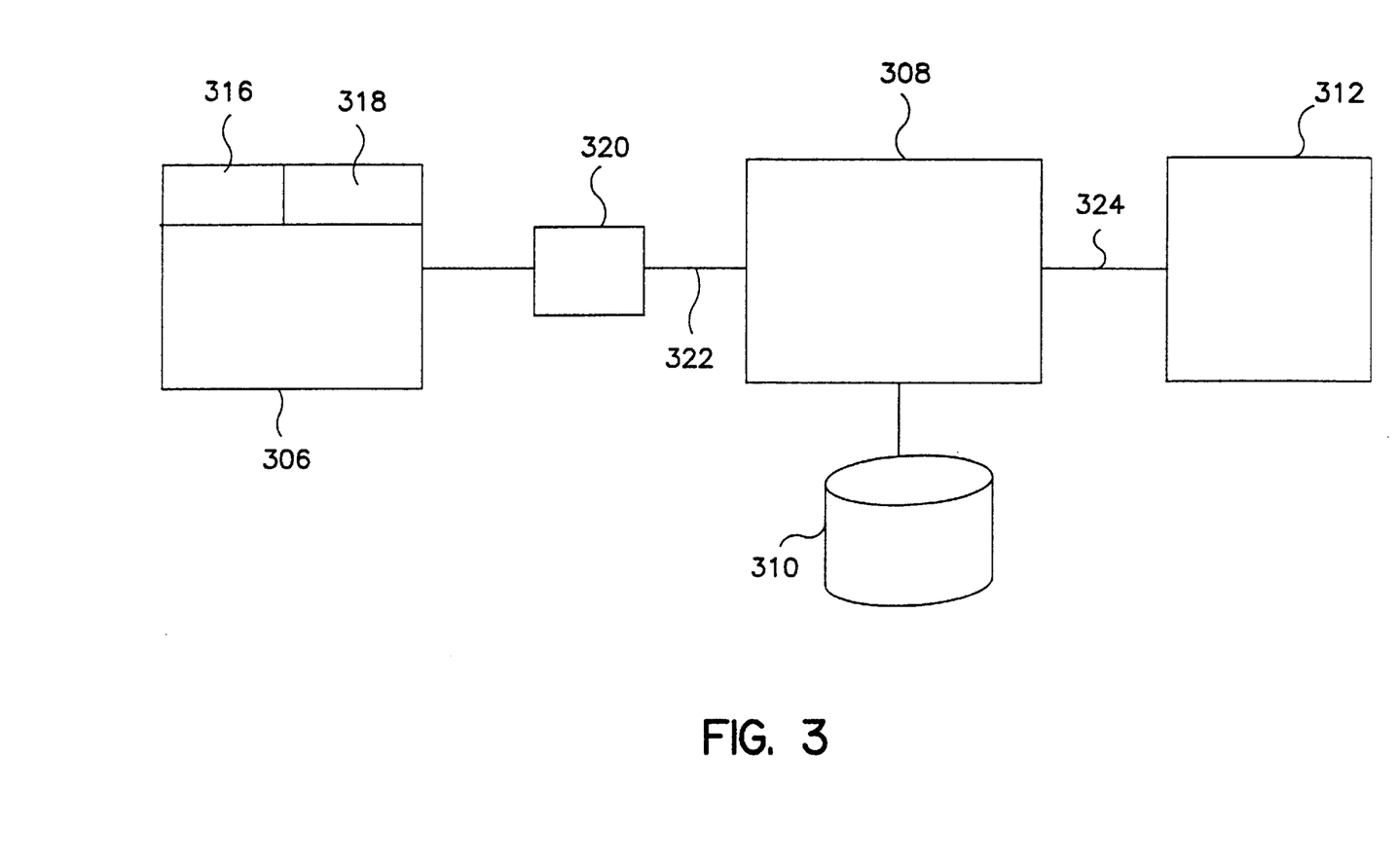
FIG. 3 is a schematic block diagram of an integrated transaction card used with a prepaid telephone service system

As shown in FIG. 3, phone card 105 may be used in a telecommunications network that includes a host computer 308 having a memory database 310. A calling party module 306 communicates with host computer 308 along a communications link 322. Preferably, caller module 306 comprises a conventional telephone having a keypad 316 and/or an input/output module 318 for reading bar code data, magnetic strip data, or data transferred by any other suitable medium. The incoming call is routed to the host computer 308 by way of a Local Exchange Carrier ("LEC") 320. Host computer 308 routes the incoming call through communications link 324 to a destination 312. The call connection is monitored by the host computer 308.

Host computer 308 includes telephone switching equipment suitable for connecting local and long distance telephone calls. Alternatively, host computer 308 may be connected to a remote long distance carrier (not shown) to complete long distance telephone calls. The host computer 308 includes suitable hardware and software for performing the functions set forth herein.

Figure 4:
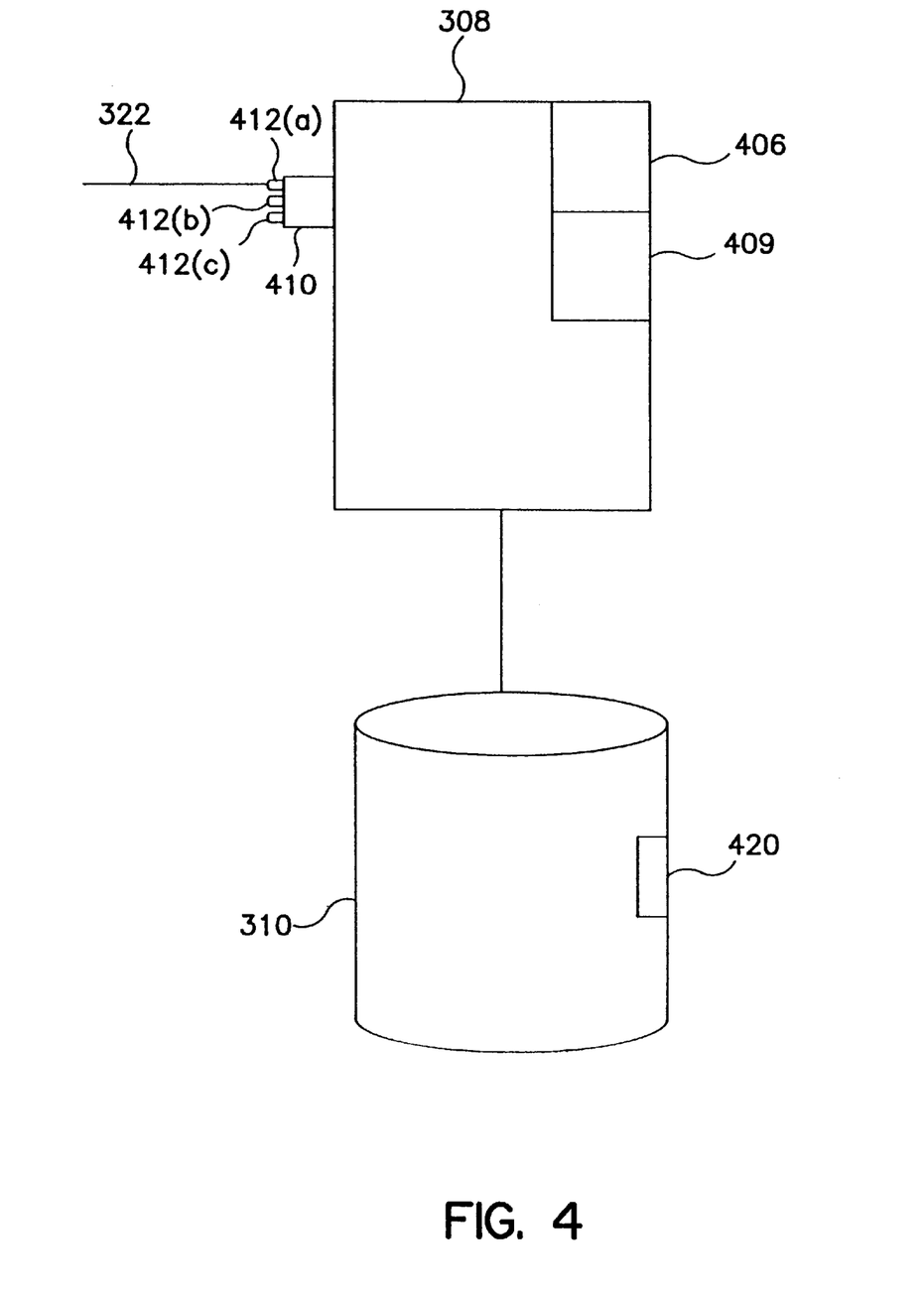
FIG. 4 is a schematic diagram of a host computer system.

As shown in FIG. 4, host computer 308 suitably includes an incoming call trunk 410, a central processing unit ("CPU") 406, and a memory unit 409, for example, a read only memory ("ROM"), a random access memory ("RAM"), or the like. The system further includes a database 310 and an account database 420. The memory 409 and databases 310 and 420 may suitably comprise a compact disk-recordable ("CD-R"), a tape drive, other recordable media, or combinations thereof suitably accessible by processor 406.

The database 310 includes an account database 420 for storing information relating to the prepaid account associated with calling card 105. For example, the identification number, expiration date, and like information may be stored in database 310 or, preferably, in account database 420. Alternatively, the user can register the transaction instrument 205 with the host computer 308 to facilitate faster regeneration transactions. In that case, funds are deducted or withdrawn from transaction instrument 205 and transferred to calling card 105 without entering information relating to the funds source (e.g. the transaction card 205). Such information is stored in database 310 or database 420. The user simply instructs the host computer 308 to transfer funds from instrument 205 to card 105 in each transaction. In that case, the user simply presses the key(s) on keypad 316 to indicate the amount of funds to be transferred to phone card 105.

Alternatively, host computer 308 may be equipped with voice recognition circuitry configured to recognize amounts spoken into telephone 306. The host system 308 can also automatically withdraw funds from the transaction instrument 205 and regenerate prepaid card 1 05 without requiring the consumer to independently authorize each withdrawal.

With continued reference to FIG. 4, trunk 410 suitably includes one or more incoming telephone lines 412(a)–412(c) each corresponding to a phone number, such as an 800 number, a 900 number, a series of numbers, or the like. An incoming line 412(a)–(c) may also be used to process phone calls in one or more additional foreign languages such as Spanish. Accordingly, host computer 308 is configured to accommodate a large number of incoming telephone lines thereby facilitating particular feature sets. More particularly, host computer 308 may be suitably configured to process incoming calls from a wide variety of caller hardware configurations including personal computers, voice telephone extensions, facsimile machines, modems, TTY and TTD devices, and the like.

Host Computer 308 may also be configured to process various incoming calls as a function of the anticipated hardware and other characteristics associated with the incoming call. In addition, the incoming lines may be configured to process incoming calls based on non-hardware configurations, such as the type of service provided to a particular clientele. The processor 406 is suitably configured to retrieve appropriate software modules from memory 409 to appropriately access prepaid accounts in database 310, place and process phone calls, or other appropriate tasks.

Figure 5A:
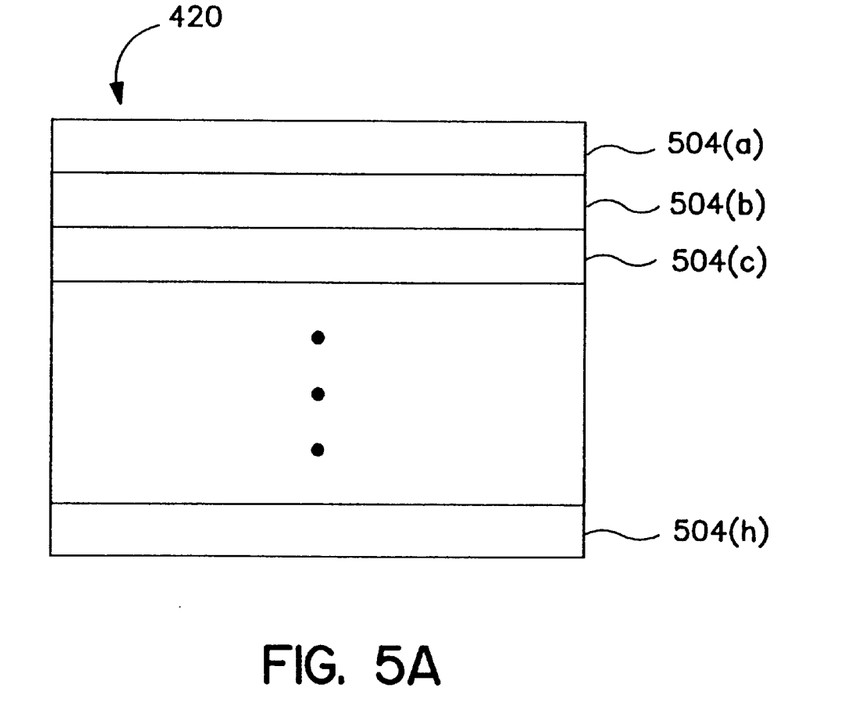
FIG. 5A is a schematic diagram of a memory sector having a plurality of account data records.

As shown in FIG. 5A, the account database 310 suitably includes a plurality of data records 504(a)–504(n) relating to the various accounts maintained by host computer 308 in database 310. More particularly, the data records 504(a)–(n) suitably includes account data pertaining to the phone card 105. The data records further include information for transferring funds from corresponding transaction instrument 205 to card 105.

Figure 5B:
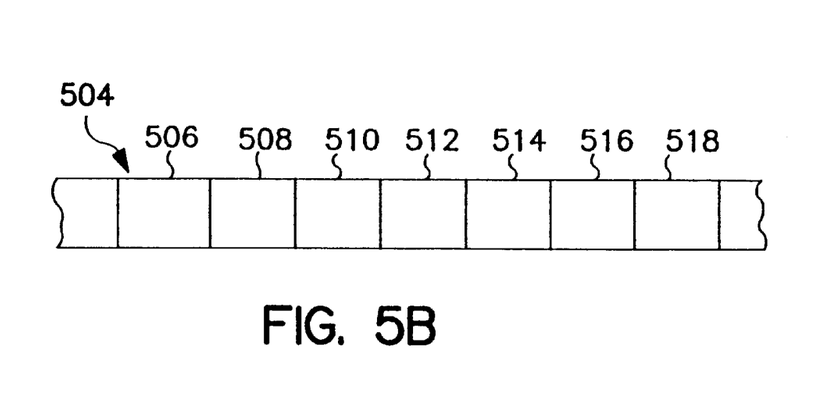
FIG. 5B is a detailed schematic diagram of an account data record shown in FIG. 5A.

As shown in FIG. 5B, each data record 504 suitably embodies a plurality of fields 506, 508, 510, 512, 514, 516, 518 corresponding to various parameters associated with each account. For example, a first field 506 may correspond to the authorization number 142 of calling card 105. A second field 508 may include the initial value of phone card 105 when issued to the consumer. A third field 510 may indicate the current balance of the account associated with card 105. A field 512 suitably indicates whether transaction card 205 is a prepaid card, a debit card, an American Express™ credit card, or other credit card associated with the calling card 105. A field 514 suitably corresponds to the authorization or identification number of transaction card 205. A field 516 includes the expiration date of transaction card 205 or other information necessary for transferring funds from card 205 to prepaid card 105. One or more additional fields 518 may include additional information necessary to accommodate other data associated with the cardholder, the account, and the like.

Figure 6:
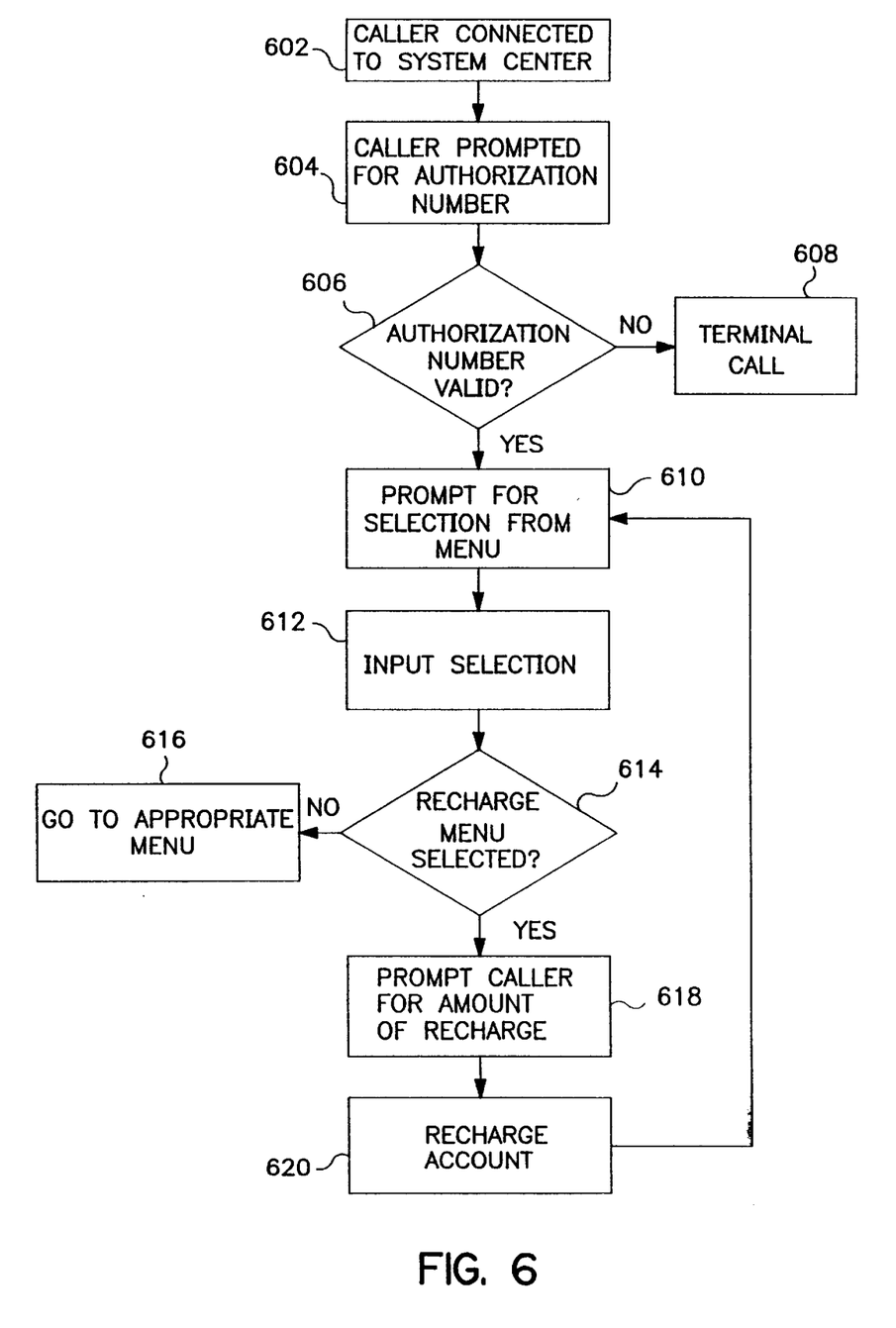
FIG. 6 is a schematic flowchart showing a sequence for regenerating a phone card; and, FIG. 7 is a schematic flowchart showing another sequence for regenerating a phone card.

As shown in FIG. 6, one embodiment of the present invention relates to a method and apparatus for regenerating a prepaid phone card when the caller-customer is connected to the host computer 308. The method may be implemented entirely with hardware such as digital devices and logic circuits. Preferably, a computer-readable program code is stored, at least in part, in a memory 409 in the host computer 308. The program code is executed by CPU 406.

A caller uses calling station 306 to dial access number 140 on calling card 105. Once host system 308 is connected to calling station 306 as shown at block 602, host computer 308 executes block 604 prompting the caller for the authorization number 142. The prompt may be a tone that the subscriber recognizes as a prompt for account code 142 or audio instructions requesting the subscriber to input account code 142. Alternatively, it may be desirable to enter the access phone number 140 and account code 142 through the input/output module 318 of phone 306. For example, a bar code containing both phone number 140 and account number 142 are scanned into calling station 306 with a bar code reader.

At block 606, the host computer 308 accesses account database 310 and determines if account code 142 is valid. If account code 142 is not valid, the host computer 308 determines if the number of incorrect authorization number entries attempted for that call has reached a preset limit. Host system 308 may terminate the connection between telephone 306 and host system 308 if the limit is reached. If the preset limit has not been reached, host computer 308 executes block 602 prompting the caller to enter a valid authorization code 142.

Upon entry of a valid authorization number 142, host computer 308 executes block 610 prompting the caller to make a selection from the calling menu. The calling menu includes options such as placing a domestic/international phone call; selecting the speed dialing feature; connecting to a customer service representative; checking the account balance associated with calling card 105; or regenerating the account associated with phone card 105. At block 612, host system 308 executes the caller's selection. If the regeneration option was selected at block 614, host system 308 executes the requested function and executes block 618 prompting the caller for an amount to be regenerated. If the caller selects another option, the computer 308 executes block 616 retrieving the appropriate menu.

To regenerate the card 105, the host computer 308 prompts the caller with "press one to purchase $10 of calling time, press two to purchase $20 of calling time, press three to purchase $30 of calling time . . . " and so on. Alternatively, the caller enters the amount of money or units to purchase by pressing the corresponding number or series of numbers on the phone keypad and then entering the pound sign ("#") to signal completion.

It will be appreciated that other methods of entering the amount of funds to be transferred are also possible. For example, voice recognition circuitry in host system 308 will allow a caller to speak the amount of funds to be transferred into the telephone 306. Alternatively, each depression of a key may signal the transfer of a predetermined increment (e.g. $10).

Host system 308 executes block 620 regenerating card 105 by finding the data record corresponding to the particular account code 142 by searching a predetermined field (e.g., field 506) of data records 504(*a*)–504(*n*). Once the appropriate data record is found, host computer 308 retrieves the necessary information from fields 512, 514, 516 relating to the transaction instrument 205 and transfers the selected amount of funds to telephone card 105. Subsequently, account balance 510 is updated to reflect the fund transfer. Once the account is regenerated, host system 308 executes block 610 prompting the user for the next appropriate action (e.g., placing a long distance phone call). The user may terminate the connection with host system 308 anytime by simply hanging up the receiver of phone 306.

Figure 7:
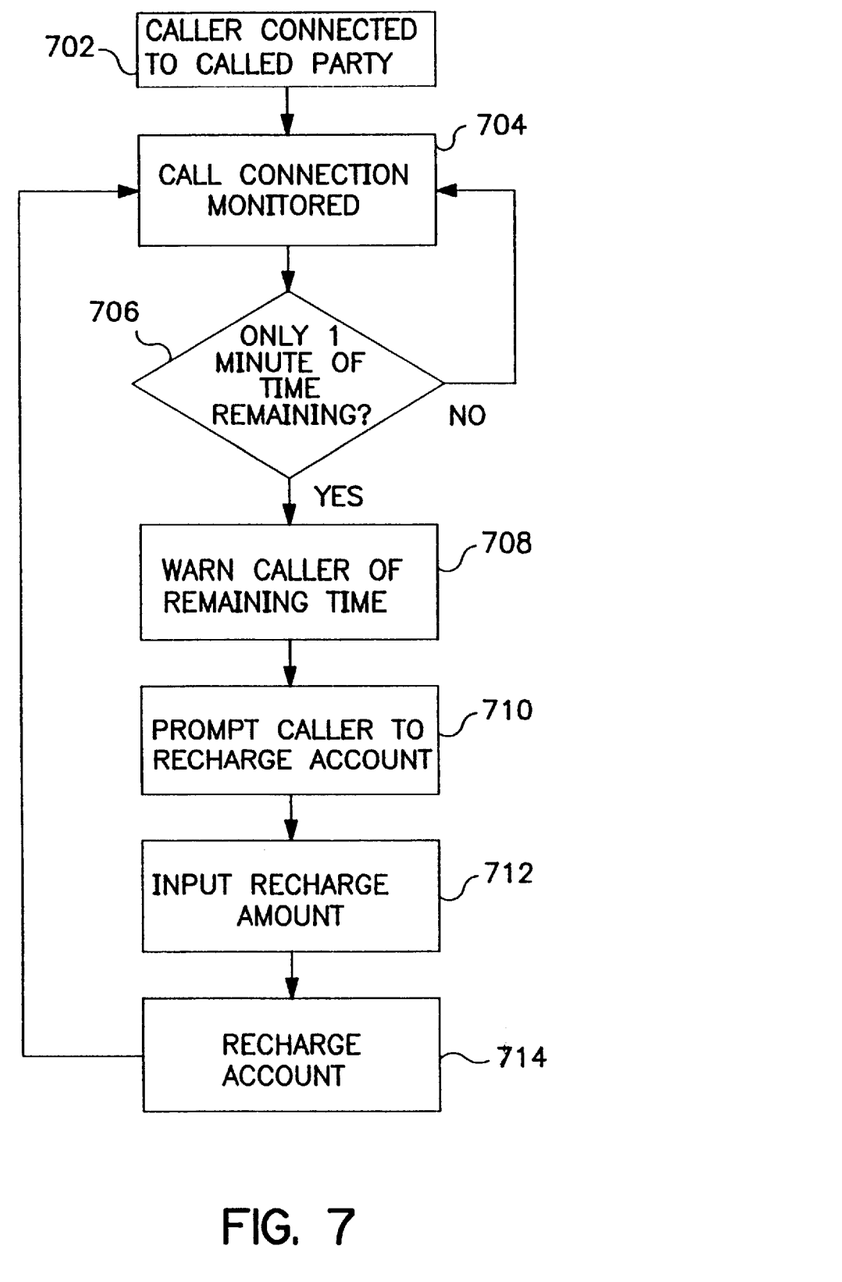

Another embodiment of the present invention is shown in FIG. 7. With reference to FIGS. 1–5, the method allows a user to regenerate phone card 105 during a phone call connection to a third party to prevent disconnection. Disconnection may occur if the running account balance in field 510 drops to zero or below some other predetermined value.

Once the caller connects to the called party shown in block 702, host computer 308 executes block 704 monitoring the call connection. As the call in monitored, the host computer 308 continuously decreases the balance of account 142 throughout the duration of the call connection. As the account 142 decreases, the host system 308 executes block 706 to monitor whether the account balance has dropped to a level whereby only enough funds remain to pay for 1 minute. When only one minute (or some other predetermined amount of time or money) remains, the host computer 308 executes block 708 warning the caller of the time remaining before disconnecting the call. The warning may an audible beep, a recorded voice announcement (e.g., "You have one minute of time remaining"), or any other suitable means for informing the user.

After the caller has been warned, the host computer executes block 710 prompting the caller to regenerate the phone card 105. The prompt may be any of the following messages: "Press one to purchase $10 of calling time; two to purchase $20 of calling time; three to purchase $30 of calling time . . . " and so on. At that point, the caller executes block 712 inputting the amount to regenerate card 105. Host computer 308 executes block 714 finding the data record corresponding to the particular account code 142 by searching field 506 of data records 504(*a*)–504(*n*). Host system 308 then retrieves the necessary information from fields 512, 514, 516 relating to associated transaction instrument 205. The running balance field 510 is updated.

After the running balance is updated, the host computer executes block 714 regenerating account 142 with the proper amount of funds. Host computer 308 returns and executes block 704 monitoring the call connection. In a preferred embodiment, the call connection between the caller and called party is not disconnected during the regenerating process.

Preferably, the integrated transaction card is constructed from paper, plastic, cardboard or any other durable or convenient material. More preferably, the integrated transaction card is plastic having a length in the range of 8.5–8.7 cm, a height in the range of 5.3–5.5 cm, and a thickness in the range of 0.65–0.85 mm. The integrated transaction card has two sides. One side includes a transaction instrument such as a credit card, debit card, prepaid instrument, or the like. The other side includes a prepaid card such as a prepaid telephone card.

Although the present invention is set forth herein in the context of the appended drawing figures, it should be appreciated that the invention is not limited to the specific forms shown. Various other modifications, variations, and enhancements in the design and arrangement of the integrated transaction card, prepaid telephone card, host computer system, transaction instrument, and the like as set forth herein may be made without departing from the spirit and scope of the present invention as set forth in the appended claims.

What is claimed is:

1. A method for regenerating a prepaid phone card having an account balance, comprising the steps of:

providing an integrated transaction card having a prepaid phone card feature and a transaction instrument feature associated therewith;

electronically establishing a prepaid call session by connecting a calling party, using said prepaid phone card feature, with a host computer and a third party; and, transferring funds from said transaction instrument feature to said phone card feature during said prepaid call session.

2. The method of claim 1 further including the step of:

issuing a warning to said calling party when a first account associated with said prepaid phone card feature is one minute from reaching a fund value of zero.

3. The method of claim 1, wherein said transaction instrument feature comprises at least one of a debit card, a credit card, and a charge card, further including the step of:

validating said transaction instrument feature through the use of a PIN code corresponding to said transaction instrument feature.

4. The method of claim 3, wherein said transferring funds step comprises electronically transferring a predetermined amount of funds from a second account associated with said transaction instrument feature to said first account.

5. A method for regenerating a prepaid phone card (105) having a first account associated therewith, comprising the steps of:

electronically connecting a calling party, using an integrated transaction card (100), to a host computer (308) having a database wherein, said integrated transaction card (100) includes a prepaid phone card (105) feature and a transaction instrument (205) feature associated therewith;

transmitting an account number (209) and/or personal identification number from said calling party to said host computer (308);

transmitting from said calling party to said host computer indicia of an amount of funds to be transferred from a transaction instrument (205) account to said first account;

validating the account number (209) and/or personal identification number; and, transferring the amount of funds from said transaction instrument (205) account to said first account in response to said validating step during a prepaid call session.

6. The method of claim 5 wherein said validating step is performed by said host computer accessing information stored in the database corresponding to said transmitted account number.

7. The method of claim 6 wherein said integrated transaction card comprises at least one of a debit card, a credit card, and a prepaid transaction card.

8. The method of claim 6 wherein said information includes an identification number and an expiration date of said integrated transaction card.

9. The method of claim 6 further comprising the step of:
electronically connecting said calling party to a destination telephone number after said transferring step.

10. The method of claim 8 further comprising the step of:
storing said account number, personal identification number, and expiration date in said database prior to said connecting step.

11. The method of claim 6 further comprising the step of:
storing said account number and said personal identification number in said database prior to said connecting step.

12. An apparatus for regenerating a prepaid phone card (105) having an account balance comprising:
means for electronically connecting a calling party using an integrated transaction card (100) with a host computer (308) and a third party, wherein said integrated transaction card (100) includes a prepaid phone card (105) feature and a transaction instrument (205) feature associated therewith; and,
means for transferring funds from the transaction instrument (205) to the phone card (105) during a prepaid call session.

13. The apparatus of claim 12 further including:
means for warning the calling party when the prepaid phone card is one minute from reaching a fund value of zero.

14. The apparatus of claim 12 further including:
means for validating the transaction instrument, wherein the transaction instrument is a debit card, a credit card, or a prepaid transaction card.

15. The apparatus of claim 12 wherein the transferring means transfers a predetermined amount of funds.

16. The apparatus of claim 13 or 14 wherein the warning means, validating means and transferring means is a host computer and the connecting means includes a keypad, an input/output modality, a local exchange carrier, a communications link and a plurality of incoming call trunk.

17. An apparatus for regenerating a prepaid phone card (105) having an account balance comprising;
means for electronically connecting a calling party using an integrated transaction card (100) to a host computer (308) having a database (310), wherein said integrated transaction card (100) includes a prepaid phone card (105) feature and a transaction instrument (205) feature associated therewith;
means for transmitting an account number (209) and/or personal identification number to the host computer (308);
means for requesting an amount of funds to be transferred from the transaction instrument (205) to the phone card (105);
means for validating the account number (209) and/or personal identification number; and,
means for transferring the amount of funds from the transaction instrument (205) to the prepaid phone card during a prepaid call session (105).

18. The apparatus of claim 17 wherein the means for validating is a host computer capable of accessing information stored in a database corresponding to a transmitted account number.

19. The apparatus of claim 18 wherein the transaction instrument is a debit card, a credit card, or a prepaid transaction card.

20. The apparatus of claim 17 wherein the information includes an identification number and an expiration date of the transaction instrument.

21. The apparatus of claim 17 further comprising:
means for electronically connecting the calling party to a destination telephone number after the transferring step.

22. The apparatus of claim 17 further comprising:
means for storing the transaction instrument's account number, personal identification number, and expiration date.

23. The apparatus of claim 22 wherein the storing means is a database.

24. A method for recharging a prepaid phone card (105) having an account balance comprising the steps of:
decrementing said account balance of said phone card (105) at appropriate intervals during the duration of a call connection between a calling party and a called party;
transferring funds to said phone card (105) from a transaction instrument (205) associated with said phone card (105) without requiring said calling party to identify said transaction instrument (205) during said call connection; and
updating said account balance of said phone card (105) during a prepaid call session in accordance with said transfer of funds.

25. An integrated transaction instrument having a first side and a second side comprising:
a prepaid telephone card on said first side comprising an access telephone number for accessing a prepaid telephone service provider and an authorization number for accessing an account database at said service provider;
a transaction card for purchasing various services or products on said second side; and
means for associating said transaction card with said telephone card so that funds may be transferred from said transaction card to said telephone card without requiring a user to enter a source of said funds.

26. A computer system for transferring funds between a transaction instrument (205) and a prepaid telephone card (105) comprising:

an incoming call trunk (410) for connecting to a calling party using said prepaid telephone card (105);

an outgoing call trunk for connecting said calling party to a desired telephone number;

an account database (310) for storing an account balance associated with said prepaid telephone card (105);

a memory (410) for storing data identifying said transaction instrument (205);

a central processing unit (406) configured to input from said calling party an amount of funds to transfer to said prepaid telephone card (105), retrieve from said memory data identifying said transaction instrument (205), transfer funds from said transaction instrument (205) to said prepaid telephone card (105) without requiring said calling party to identify said transaction instrument (205), and update said account balance of said prepaid telephone card (105) in accordance with said transfer of funds during a prepaid call session.

27. An article of manufacture comprising a computer useable medium having computer-readable program code means embodied therein for adding funds to a prepaid telephone card (105) having an account balance, the computer-readable program code means in said article of manufacture comprising:

means for transferring funds to said prepaid telephone card (105) from a transaction instrument (205) associated with said prepaid telephone card (105) without requiring a prepaid telephone card (105) user to identify said transaction instrument (205) at the time of said transfer of funds; and means for updating said account balance of said prepaid telephone card (105) in accordance with said transfer of funds during a prepaid call sesion.

* * * * *